US009262694B2

(12) United States Patent
Ishii (10) Patent No.: US 9,262,694 B2
(45) Date of Patent: Feb. 16, 2016

(54) DICTIONARY LEARNING DEVICE, PATTERN MATCHING APPARATUS, METHOD FOR LEARNING DICTIONARY AND STORAGE MEDIUM

(71) Applicant: Masato Ishii, Tokyo (JP)

(72) Inventor: Masato Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/364,467

(22) PCT Filed: Dec. 12, 2012

(86) PCT No.: PCT/JP2012/007929
§ 371 (c)(1),
(2) Date: Jun. 11, 2014

(87) PCT Pub. No.: WO2013/088707
PCT Pub. Date: Jun. 20, 2013

(65) Prior Publication Data
US 2014/0301634 A1    Oct. 9, 2014

(30) Foreign Application Priority Data

Dec. 16, 2011   (JP) .................................. 2011-275872

(51) Int. Cl.
*G06K 9/62*    (2006.01)
*G06K 9/03*    (2006.01)
*G10L 15/20*   (2006.01)

(52) U.S. Cl.
CPC ................ *G06K 9/6215* (2013.01); *G06K 9/03* (2013.01); *G06K 9/6255* (2013.01); *G10L 15/20* (2013.01)

(58) Field of Classification Search
None
See application file for complete search history.

(56) References Cited

U.S. PATENT DOCUMENTS

| | | | | |
|---|---|---|---|---|
| 4,979,213 A | * | 12/1990 | Nitta | .............................. 704/245 |
| 2006/0056697 A1 | * | 3/2006 | Jun et al. | ........................ 382/185 |
| 2009/0110303 A1 | * | 4/2009 | Nishiyama et al. | ........... 382/225 |

(Continued)

FOREIGN PATENT DOCUMENTS

| | | |
|---|---|---|
| EP | 2 372 647 A1 | 10/2011 |
| JP | 04-123276 A | 4/1992 |

(Continued)

OTHER PUBLICATIONS

International Search Report corresponding to PCT/JP2012/007929 dated Mar. 5, 2013 (5 pages).

(Continued)

*Primary Examiner* — Brian P Werner
(74) *Attorney, Agent, or Firm* — Wilmer Cutler Pickering Hale and Dorr LLP (57) ABSTRACT

Provided is a technology which enables further improvement of the accuracy of the determination in the pattern matching processing. A dictionary learning device 1 includes a score calculation unit 2 and a learning unit 3. The score calculation unit 2 calculates a matching score representing a similarity-degree between a sample pattern, which is a sample of a pattern which is likely to be subjected to a pattern matching processing, and a degradation pattern resulting from a degrading processing on the sample pattern. The learning unit 3 learns a quality dictionary based on the calculated matching score and the degradation pattern. The quality dictionary is a dictionary which is used in a processing to evaluate a degradation degree (quality) of a matching target pattern of being pattern of an object on which the pattern matching processing is carried out.

10 Claims, 6 Drawing Sheets

(56) References Cited

U.S. PATENT DOCUMENTS

2010/0008425 A1* 1/2010 Yamada .................. 375/240.16
2012/0207357 A1* 8/2012 Bedros et al. ................ 382/117

FOREIGN PATENT DOCUMENTS

| JP | 2006-072553 A | 3/2006 |
| JP | 2007-140823 A | 6/2007 |
| JP | 2008-107408 A | 5/2008 |
| JP | 2010-026848 A | 2/2010 |
| JP | 2010-129405 A | 6/2010 |
| JP | 2011-002494 A | 1/2011 |
| JP | 2011-197902 A | 10/2011 |

OTHER PUBLICATIONS

Hiroyuki Ishida, et al., "Generative Learning Method for the Recognition of Low-Resolution Characters Using the Subspace Method," IEICE Technical Report, May 20, 2004, vol. 104, No. 90, pp. 37-42.

* cited by examiner

DICTIONARY LEARNING DEVICE, PATTERN MATCHING APPARATUS, METHOD FOR LEARNING DICTIONARY AND STORAGE MEDIUM

CROSS-REFERENCE TO RELATED APPLICATIONS

This application is a national stage application of International Application No. PCT/JP2012/007929 entitled "Dictionary Learning Device, Pattern Matching Apparatus, Method for Learning Dictionary and Storage Medium," filed on Dec. 12, 2012, which claims the benefit of the priority of Japanese Patent Application No. 2011-275872, filed on Dec. 16, 2011, the disclosures of each of which are hereby incorporated by reference in their entirety.

TECHNICAL FIELD

The present invention relates to a technology for a quality dictionary which is used in a pattern matching processing.

BACKGROUND ART

A pattern matching processing is a processing which determines whether or not a plurality of patterns targeted for the pattern matching processing are identical patterns. The pattern is face image, fingerprint image, speech-signal waveform or the like. This pattern matching processing is a technology known as a particularly important technology in a field of biometrics authentication.

An example of the pattern matching processing will be briefly described below. First, a matching score is calculated, the matching score represents how much two patterns targeted for the pattern matching processing are similar. As one of methods for calculating the matching score, there is a method in which the matching score is calculated by using, for example, a feature vector extracted from the pattern targeted for pattern matching processing and a preliminarily prepared feature-vector group which is called a discrimination dictionary. In most of cases, the discrimination dictionary is generated by machine learning using a large number of pattern examples.

After the matching score has been calculated in such a way as described above, the matching score is compared with a threshold value, and a matching result (that is, whether or not the two patterns targeted for the pattern matching processing are identical) is determined. In this way, the pattern matching processing is carried out.

By the way, as one of problems on the pattern matching processing, there exists a problem described below. The existing problem is a problem which is caused by a quality degradation of a pattern (in other words, unsharpness (indistinctness) of a pattern). That is, in a case where a degree of the quality degradation of the pattern is large, sometimes, information necessary to the pattern matching processing (for example, information representing features of a face, a fingerprint or the like) is lost. For example, in a case where facial images of persons targeted for matching processing are blurry and indistinct, a facial image of any one of the persons results in resembling facial images of the other ones of the persons. For this reason, in a face matching processing based on blurry facial images, although two facial images targeted for the pattern matching processing are not images of an identical person, an erroneous determination that the two facial images are images of an identical person is likely to be made.

In this regard, there has been proposed a method for estimating the qualities (degradation degrees) of patterns and performing the pattern matching processing to the patterns in view of information related to the estimated qualities. In PTL 1 (Japan Patent Application Laid-Open Publication No. 2010-129045), there is disclosed a technology which, in fingerprint matching processing, detects (determines) a blur of a fingerprint image as information for estimating the quality of each pattern. In PTL 2 (Japan Patent Application Laid-Open Publication No. 2011-002494), there is disclosed a technology which, in speech recognition processing, estimates a sound quality level as information estimating the quality of the pattern.

Further, in PTL 3 (Japan Patent Application Laid-Open Publication No. 2007-140823), there is disclosed a technology which performs the pattern matching processing in view of condition under which the pattern is photographed (for example, a lighting environment, a direction of a face, presence or absence of a wearing object (for example, sunglasses)).

Moreover, in PTL 4 (Japan Patent Application Laid-Open Publication No. 2006-072553), there is disclosed a technology which, in biometrics authentication, in a case where an input image is indistinct, performs the pattern matching processing after having corrected the image. Furthermore, in PTL 5 (Japan Patent Application Laid-Open Publication No. 2008-107408), there is disclosed a technology which, in speech recognition processing, performs the speech recognition processing in view of an ambient environment.

CITATION LIST

Patent Literature

[PTL 1] Japan Patent Application Laid-Open Publication No. 2010-129045

[PTL 2] Japan Patent Application Laid-Open Publication No. 2011-002494

[PTL 3] Japan Patent Application Laid-Open Publication No. 2007-140823

[PTL 4] Japan Patent Application Laid-Open Publication No. 2006-072553

[PTL 5] Japan Patent Application Laid-Open Publication No. 2008-107408

SUMMARY OF INVENTION

Technical Problem

As described above, the pattern matching processing is the technology employed in authentication technologies, such as biometrics authentication. Thus, it is predicted that any erroneous determination in the pattern matching processing causes a significant problem. For this reason, further accuracy of the determination is required in the pattern matching processing.

The present invention has been invented to solve the aforementioned problem. That is, a main object of the present invention is to provide a technology which enables further improvement of the accuracy of the determination in the pattern matching processing.

Solution to Problem

A dictionary learning device of the present invention includes score calculation means for calculating a matching score representing a similarity-degree between a sample pattern which is a sample of a pattern which is likely to be subjected to a pattern matching processing and a degradation pattern resulting from a degrading processing on the sample pattern; and learning means for, based on the calculated matching score and the degradation pattern, learning a quality dictionary which is used in a processing to evaluate a degradation degree of a matching target pattern of being target to be subjected to the pattern matching processing.

A pattern matching apparatus of the present invention includes a quality dictionary that is learned by a dictionary learning device of the present invention, quality evaluation means for, based on the quality dictionary, evaluating a degradation degree of a matching target pattern which is target to be subjected to a pattern matching processing;

score calculation means for calculating a matching score representing a similarity-degree among the plurality of matching target patterns by a processing corresponding to a processing through which the dictionary learning device calculates the matching score;

score compensation means for compensating the matching score by using an evaluation result obtained by the quality evaluation means; and determination means for determining a result of matching among the plurality of matching target patterns based on the compensated matching score.

A method for learning dictionary of the present invention includes calculating, by a computer, a matching score representing a similarity-degree between a sample pattern which is a sample of a pattern which is likely to be subjected to a pattern matching processing and a degradation pattern resulting from a degrading processing on the sample pattern, and learning, by the computer, based on the calculated matching score and the degradation pattern, a quality dictionary which is used in a processing to evaluate a degradation degree of a matching target pattern of being target to be subjected to the pattern matching processing.

A non-transitory computer-readable storage medium that stores therein a control procedure which causes a computer to execute a processing, includes the processes of calculating a matching score representing a similarity-degree between a sample pattern which is a sample of a pattern which is likely to be subjected to a pattern matching processing and a degradation pattern resulting from a degrading processing on the sample pattern; and learning, based on the calculated matching score and the degradation pattern, a quality dictionary which is used in a processing to evaluate a degradation degree of a matching target pattern of being target to be subjected to the pattern matching processing.

In addition, the main object of the present invention can be also achieved by the method for learning dictionary related to the dictionary learning device of the present invention configured in such a way as described above. Further, the main object of the present invention can be also achieved by a computer program, with which a computer realizes the dictionary learning device of the present invention and the method for learning dictionary related to the dictionary learning device, as well as a computer-readable storage medium which stores the computer program.

Advantageous Effects of Invention

According to the present invention, it is possible to further improve the accuracy of the determination in the pattern matching processing. This makes it possible to provide a pattern matching apparatus having higher reliability.

DESCRIPTION OF EMBODIMENTS

Hereinafter, exemplary embodiments according to the present invention will be described with reference to the drawings.

(First Exemplary Embodiment)

Figure 1:
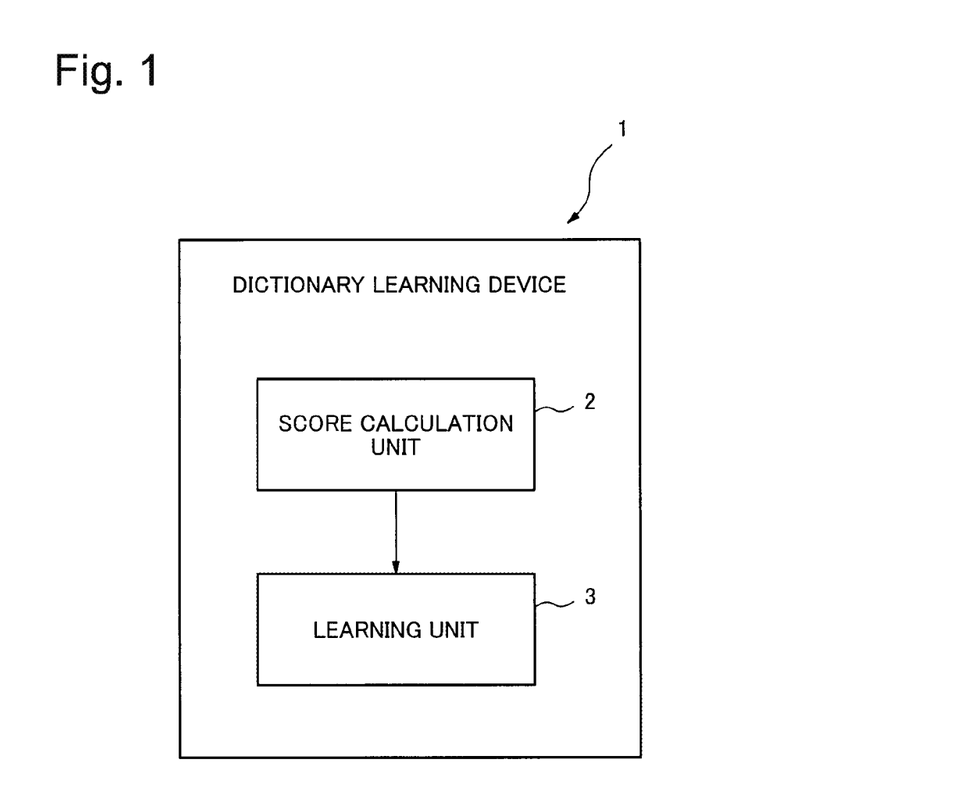
FIG. 1 is a block diagram illustrating a simplified configuration of a dictionary learning device according to a first exemplary embodiment of the present invention.

FIG. 1 is a block diagram illustrating a simplified configuration of a dictionary learning device according to a first exemplary embodiment of the present invention. This dictionary learning device 1 according to this first exemplary embodiment is a device (for example, a computer) which learns a quality dictionary to use in pattern matching processing (that is, generates the quality dictionary to use in pattern matching processing by means of machine learning). The dictionary learning device 1 includes a score calculation unit (score calculation means) 2 and a learning unit (learning means) 3.

The score calculation unit 2 is provided with a function of calculating a matching score representing a similarity-degree between a sample pattern, which is a sample of a pattern which is likely to be subjected to a pattern matching processing, and a degradation pattern resulting from a degrading processing on the sample pattern.

The learning unit 3 is provided with a function of learning a quality dictionary based on the calculated matching score by the score calculation unit 2 and the degradation pattern. The quality dictionary is used in a processing to evaluate degradation degree (quality) of a matching target pattern on which the pattern matching processing is carried out.

Figure 2:
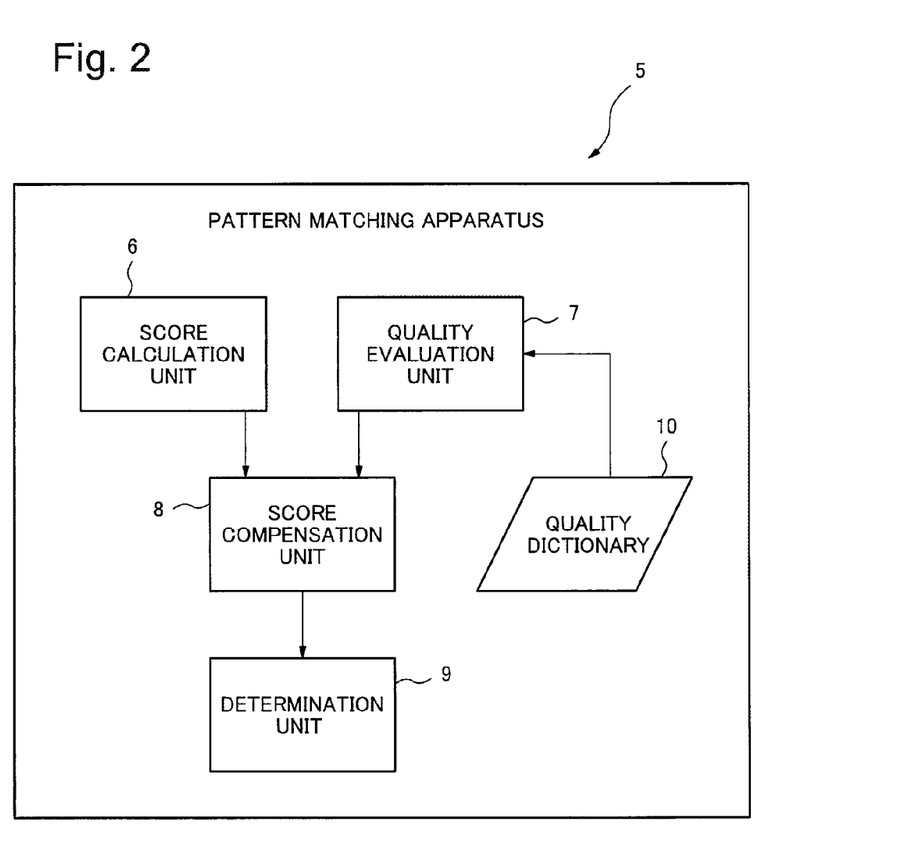
FIG. 2 is a block diagram illustrating a simplified configuration of a pattern matching apparatus which uses a quality dictionary learned by the dictionary learning device of the first exemplary embodiment.

FIG. 2 is a block diagram illustrating an example of a simplified configuration of a pattern matching apparatus which uses the quality dictionary generated by the dictionary learning device 1. This pattern matching apparatus 5 includes a score calculation unit (score calculation means) 6, a quality evaluation unit (quality evaluation means) 7, a score compensation unit (score compensation means) 8, a determination unit (determination means) 9 and a quality dictionary 10.

The quality dictionary 10 is a dictionary which has been learned (generated) by the dictionary learning device 1 in advance.

The score calculation unit 6 is provided with a function of calculating a matching score representing a similarity-degree among a plurality of matching target patterns by means of a processing the same as the processing on which the score calculation unit 2 constituting the dictionary learning device 1 calculates the matching score.

The quality evaluation unit 7 is provided with a function of evaluating (calculating) a degradation degree (quality) of the matching target pattern by using the quality dictionary 10.

The score compensation unit 8 is provided with a function of compensating the calculated matching score by the score calculation unit 6 by using the evaluation result obtained by the quality evaluation unit 7.

The determination unit 9 is provided with a function of determining a matching result based on the compensated matching score.

The dictionary learning device 1 and the pattern matching apparatus 5 according to this first exemplary embodiment bring about the following effects. That is, in PTL 1 to 3 described above, the degradation degree of the pattern such as image or sound is merely evaluated as a signal and is not evaluated from a viewpoint of the pattern matching processing. In contrast, the dictionary learning device 1 according to the first exemplary embodiment generates the quality dictionary used in the pattern matching processing by means of machine learning using the matching score representing the similarity-degree among patterns. Through evaluating the degradation degree (quality) of the matching target pattern by using the generated quality dictionary, the result of the evaluation of the matching target pattern becomes a result in view of the pattern matching processing. In other words, the use of the quality dictionary having been generated by the dictionary learning device 1 enables realization of the quality evaluation of pattern specialized in the pattern matching processing.

In this way, the pattern matching apparatus 5 is capable of evaluating the degradation degree (quality) of the matching target pattern in view of the pattern matching processing. Further to this, through use of the evaluation result, the pattern matching apparatus 5 enables further improvement of the accuracy of the pattern matching processing. Consequently, this enables further improvement of the reliability of the pattern matching apparatus 5.

(Second Exemplary Embodiment)

Hereinafter, a second exemplary embodiment according to the present invention will be described.

Figure 3:
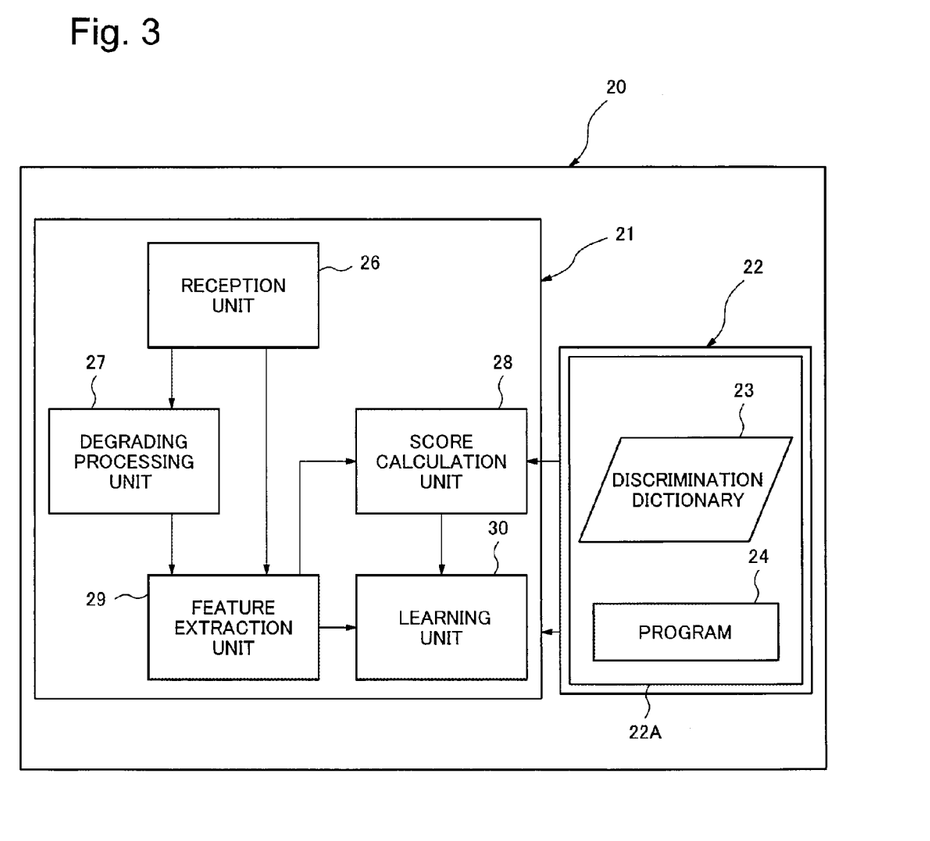
FIG. 3 is a block diagram illustrating a simplified configuration of a dictionary learning device according to second and third exemplary embodiments of the present invention.

FIG. 3 is a block diagram illustrating a simplified configuration of a dictionary learning device according to the second exemplary embodiment. The dictionary learning device 20 according to this second exemplary embodiment includes a control device 21 and a storage device 22. The storage device 22 includes a storage medium (a non-volatile storage medium) 22A, such as a hard disk. The storage medium 22A stores therein various pieces of data and computer programs (hereinafter, which will be also referred to as programs in an abbreviated manner). As one of the pieces of data stored in this storage medium 22A, there is a discrimination dictionary 23. This discrimination dictionary 23 is a dictionary which is used in a processing calculating a matching score described below. Further, as one of the programs stored in the storage medium 22A, there is a program 24 which represents a procedure in which the dictionary learning device 1 learns a dictionary. In addition, the pieces of data and the programs stored in the storage medium 22A may be stored in a portable type storage medium. In such a case, for example, the program 24 may be written into the storage medium 22A after having being read from such the portable type storage medium into the dictionary learning device 20.

The control device 21 includes, for example, a central processing unit (CPU). The control device 21 performs control of the whole operation of the dictionary learning device 20 by operating in accordance with a program having been read from the storage device 22. Specifically, the control device 21 realizes the following functions by executing the program 24. That is, the control device 21 includes a reception unit (reception means) 26, a degrading processing unit (degrading processing means) 27, a score calculation unit (score calculation means) 28, a feature extraction unit (feature extraction means) 29 and a learning unit (learning means) 30.

The reception unit 26 has a function of receiving a sample pattern (pattern for use in learning). This sample pattern is a sample of a pattern to be subjected to the pattern matching processing (that is, a pattern which is likely to become a target for the pattern matching processing).

The degrading processing unit 27 is provided with a function of performing degrading processing on the received sample pattern. Here, the sample pattern having been subjected to the degrading processing is called a degradation pattern. That is, the degrading processing unit 27 is provided with a function of generating the degradation pattern by performing the degrading processing on the sample pattern. As an example of the degrading processing, in the case where the sample pattern is an image, there is a smoothing processing (i.e., processing to gradate the image). Further, in the case where the sample pattern is a signal (for example, a speech signal), there is a processing to add noise as the other example of the degrading processing.

The feature extraction unit 29 is provided with a function of extracting features from each of the sample pattern and the degradation pattern related to the sample pattern. As the features to be extracted, for example, in the case where the pattern is an image, there are pixel values of the image, a filter response (for example, a Gabor filter response or a Sobel filter response) of the image, and the like.

The score calculation unit 28 calculates a matching score s by using combination of the features having been extracted by the feature extraction unit 29 (i.e., combinations of the features of the sample pattern and the features of the degradation pattern), and the discrimination dictionary 23 stored in the storage device 22. This matching score s can be calculated based on a mathematical equation (1) as follows:

$$s = s(x, y; \theta_d) \quad (1)$$

where, in the mathematical equation (1), x denotes a feature vector resulting from converting the extracted features of the sample pattern by the feature extraction unit 29 into a vector. y denotes a feature vector resulting from converting the extracted features of the degradation pattern by the feature extraction unit 29 into a vector. Further, $\theta_d$ denotes the discrimination dictionary 23. As a specific example of the discrimination dictionary 23, there is a matrix to project the feature vectors to a low dimensional subspace.

The learning unit 30 is provided with a function of learning (generating) a quality dictionary based on the degradation patterns (features extracted from each of degradation patterns) and the matching scores calculated using the degradation patterns. The quality dictionary is a dictionary for estimating the matching score between the degradation pattern and a virtual pattern of being in a non-degradation degree and being related to the degradation pattern. Specifically, for example, the learning unit 30 learns the quality dictionary $\theta_q$ in a mathematical equation (2) described below such that the mathematical equation (2) is satisfied.

$$s(x, y; \theta_d) \cong q(y; \theta_q) \quad (2)$$

where, in the mathematical equation (2), q denotes a predetermined function, and $\theta_q$ denotes the quality dictionary.

As one of methods for learning the quality dictionary $\theta_q$ described above, there is a method which is called a regression analysis. In addition, the matching score s used in the processing to learn the quality dictionary $\theta_q$ may be a compensated matching score resulting from compensating the matching score s calculated by the score calculation unit 28 depending on the quality of the sample pattern and the quality of the degradation pattern.

Figure 4:
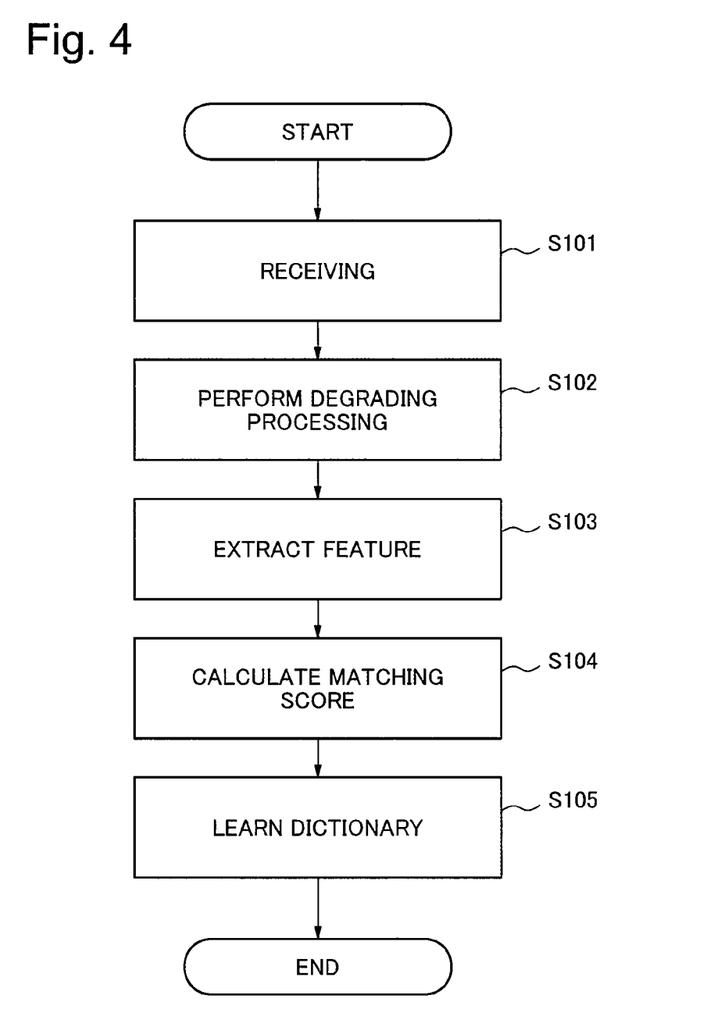
FIG. 4 is a flowchart illustrating an example of a processing related to dictionary learning, performed by the dictionary learning device according to a second exemplary embodiment of the present invention.

FIG. 4 is a flowchart illustrating an example of dictionary learning operation (processing) performed by the dictionary learning device 20 according to this second exemplary embodiment. This flowchart illustrates an example of a control procedure which is represented in a program executed by the control device 21 in the dictionary learning device 20.

For example, when the sample pattern (pattern for use in learning) is input to the dictionary learning device 20, the control device 21 (the reception unit 26) receives the sample pattern (step S101 in FIG. 4). Then, the control device 21 (the degrading processing unit 27) performs the degrading processing on the sample pattern and generates the degradation pattern (step S102). Subsequently, the control device 21 (the feature extraction unit 29) extracts features of the generated degradation pattern. Further, the control device 21 (the feature extraction unit 29) also extracts features of the sample pattern itself which is not subjected to the degrading processing (step S103).

Subsequently, the control device 21 (the score calculation unit 28) calculates the matching score s (that is, the score representing a similarity-degree between the sample pattern and the degradation pattern related to the sample pattern) by using the discrimination dictionary 23, based on the combination (x, y) which is a combination of the features extracted above (i.e., the combination (x, y) which is a combination of the features of the sample pattern and the features of the degradation pattern) (step S 104). After a certain period of time, the control device 21 (the learning unit 30) learns the quality dictionary $\theta_q$ by means of, for example, a learning method, such as the regression analysis, based on the degradation pattern and the matching score s calculated using the relevant degradation pattern (step S105).

The dictionary learning device 20 according to this second exemplary embodiment generates the quality dictionary by means of machine learning through use of the matching score just like in the first exemplary embodiment. For this reason, the evaluation of the quality of the matching target pattern through use of the quality dictionary generated by the dictionary learning device 20 enables realization of the quality evaluation of the pattern, specialized in pattern matching. Through the pattern matching processing using the quality evaluation of the pattern, the pattern matching apparatus enables further improvement of the accuracy of the pattern matching processing. That is, this dictionary learning device 20 can provide the quality dictionary which enables further improvement of the reliability of the pattern matching processing performed by the pattern matching apparatus.

(Third Exemplary Embodiment)

Hereinafter, a third exemplary embodiment according to the present invention will be described.

In this third exemplary embodiment, a specific example of the processing performed by each of the score calculation unit 28 and the learning unit 30 which is described in the second exemplary embodiment will be described. That is, the dictionary learning device according to this third exemplary embodiment has a configuration the same as the configuration of the second exemplary embodiment. For this reason, in description of this third exemplary embodiment, configuration parts the same as those of the second exemplary embodiment are denoted by identical reference signs, and overlapping description of the common configuration parts will be omitted.

In this third exemplary embodiment, the score calculation unit 28 calculates the matching score s by using a mathematical equation (3) described below. That is, a value of the matching score s becomes higher as a possibility that the feature vector x and the feature vector y are identical becomes higher, wherein the feature vector x is based on the extracted features of the sample pattern by the feature extraction unit 29, and the feature vector y is based on the extracted features of the degradation pattern by the feature extraction unit 29. From this property, in a case that a correlation coefficient is used, the matching score s can be represented by a following mathematical equation (3).

$$s = s(x, y) = \frac{(Ax)^T(Ay)}{|Ax||Ay|} \quad (3)$$

where, A is a matrix in which feature vectors are arranged as row vectors, and A denotes the discrimination dictionary 23 (corresponding to $\theta d$ in the mathematical equation (1)). This matrix A is learned (generated) in advance by means of, for example, a linear discrimination analysis method or the like, as a projection matrix projected on a subspace where a determination as to whether or not the matching target pattern is identical can be easily made. Further, $(Ax)^T$ represents a transposed matrix of a matrix (Ax). Further, |Ax| and |Ay| represent a L2 norm of the matrix (Ax) and a L2 norm of a matrix (Ay), respectively.

In this third exemplary embodiment, the learning unit 30 learns (generates) the quality dictionary u such that an approximation relation in a mathematical equation (4) described below is satisfied. That is, the quality dictionary is a dictionary which estimates the matching score between the degradation pattern and the pattern of being in a non-degradation degree and of being related to the degradation pattern. In a case that a linear function is used in this estimation, the matching score s can be represented by the mathematical equation (4).

$$s(x,y) \approx y^T u \quad (4)$$

where, in the mathematical equation (4), x denotes the feature vector based on the extracted features of the sample pattern by the feature extraction unit 29; y denotes the feature vector based on the extracted features of the degradation pattern by the feature extraction unit 29; and $y^T$ denotes a transposed vector of the feature vector y. Moreover, u denotes the quality dictionary (corresponding to $\theta_q$ in the mathematical equation (2)). The quality dictionary u is a vector corresponding to coefficients of the linear function.

In the example of the linear function described here, the learning unit 30 learns the quality dictionary u by means of, for example, the linear regression method.

This third exemplary embodiment is provided with the configuration the same as that of the second exemplary embodiment, and thus, brings about advantageous effects the same as those of the second exemplary embodiment.

(Forth Exemplary Embodiment)

Hereinafter, a fourth exemplary embodiment according to the present invention will be described.

In this fourth exemplary embodiment, an embodiment of the pattern matching apparatus using the quality dictionary which is learned (generated) by the dictionary learning device described in the second and third exemplary embodiments will be described. In addition, in description of this fourth exemplary embodiment, description overlapping with the description made in the second and third exemplary embodiments will be omitted.

Figure 5:
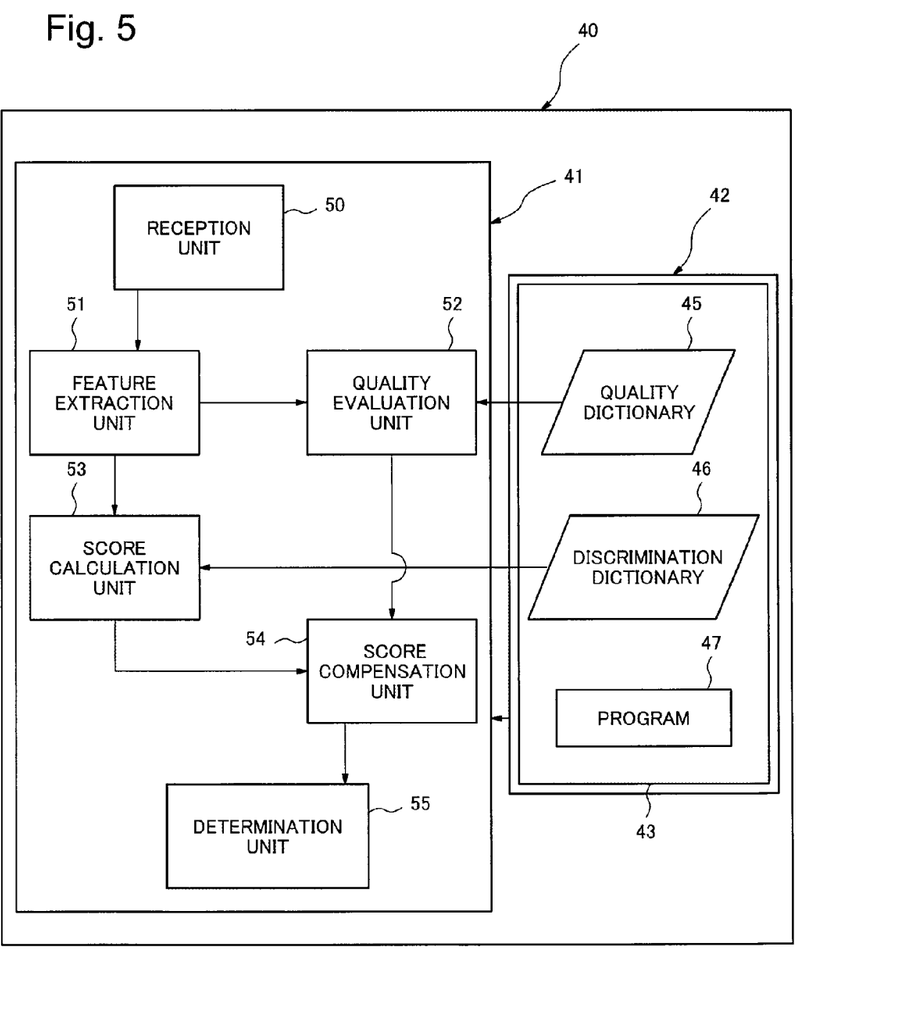
FIG. 5 is a block diagram illustrating a simplified configuration of a pattern matching apparatus according to a fourth exemplary embodiment of the present invention.

FIG. 5 is a block diagram illustrating a simplified configuration of a pattern matching apparatus according to this fourth exemplary embodiment. This pattern matching apparatus 40 includes a control device 41 and a storage device 42. The storage device 42 includes a computer-readable storage medium (a non-volatile storage medium) 43. This storage medium 43 stores various pieces of data and programs therein. In this fourth exemplary embodiment, the storage medium 43 stores therein at least a quality dictionary 45, a discrimination dictionary 46 and a program 47. It is possible that the same things as the pieces of data and the programs stored in the storage medium 43 are stored in a portable type storage medium. For example, the pieces of data and the programs may be written into the storage medium 43 after having being read from such the portable storage medium into the pattern matching apparatus 40.

The quality dictionary 45 is the dictionary which has been learned (generated) by the dictionary learning device having been described in any one of the first to third exemplary embodiments. The discrimination dictionary 46 is the dictionary the same as the discrimination dictionary 23 used for learning of the quality dictionary 45. The program 47 is a program representing a control procedure to control the whole operation of the pattern matching apparatus 40.

The control device 41 includes, for example, CPU. The control device 41 has various functions to control the whole operation of the pattern matching apparatus 40 by performing the programs read from the storage device 42. Specifically, the control device 41 includes, as a function unit, a reception unit 50, a feature extraction unit 51, a quality evaluation unit 52, a score calculation unit 53, a score compensation unit 54 and a determination unit 55.

The reception unit 50 has a function of receiving the matching target pattern in case a that the matching target pattern to be subjected to the pattern matching processing is input to the pattern matching apparatus 40.

The feature extraction unit 51 has a function of extracting features from the received matching target pattern, just like the above-described feature extraction unit 29 of the dictionary learning device 20.

The quality evaluation unit 52 has a function of evaluating the quality of the matching target pattern by using the features of the extracted matching target pattern and the quality dictionary 45. For example, it is supposed that two matching target patterns Ix and Iy to be collated with each other are input to the pattern matching apparatus 40. Here, it is supposed that features extracted from the matching target pattern Ix by the feature extraction unit 51 are a feature vector x and features extracted from the matching target pattern Iy by the feature extraction unit 51 are a feature vector y. The quality evaluation unit 52 calculates a quality $q_x$ of the matching target pattern Ix based on the feature vector x and the quality dictionary 45 in accordance with a mathematical equation (5) described below; and the quality evaluation unit 52 calculates a quality $q_y$ of the matching target pattern Iy based on the feature vector y and the quality dictionary 45 in accordance with a mathematical equation (6) described below.

$$q_x = x^T u \qquad (5)$$

$$q_y = y^T u \qquad (6)$$

where, $x^T$ in the mathematical equation (5) denotes a transposed vector of the feature vector x. Further, $y^T$ in the mathematical equation (5) denotes a transposed vector of the feature vector y. Moreover, u in each of the mathematical equations (5) and (6) denotes the quality dictionary 45.

As shown in the mathematical equations (5) and (6), in this fourth exemplary embodiment, the same quality dictionary 45 is applied to both the two matching target patterns x and y to be collated with each other.

The score calculation unit 53 has a function of calculating the matching score by using the features of each of the extracted matching target patterns Ix and Iy (i.e., the feature vectors x and y) by the feature extraction unit 51, and using the discrimination dictionary 46. In this fourth exemplary embodiment, a function to calculate the matching score is a function the same as the function used by the score calculation unit 28 in the dictionary learning device 20 which learns (generates) the quality dictionary 45. Specifically, for example, the score calculation unit 53 calculates the matching score s in accordance with a mathematical equation (7) as follows:

$$s = s(x, y) = \frac{(Ax)^T(Ay)}{|Ax||Ay|} \qquad (7)$$

where, the mathematical equation (7) is a mathematical equation the same as the mathematical equation (3).

The score compensation unit 54 has a function of compensating the calculated matching score s (s=s (x, y)) by the score calculation unit 53 in reference to the qualities $q_x$ and $q_y$ calculated by the quality evaluation unit 52. Specifically, for example, the score compensation unit 54 compensates the matching score s in accordance with a mathematical equation (8) described below, and thereby calculates a post-compensation matching score $s_h$.

$$s_h = s(x,y) + P(q_x, q_y) \qquad (8)$$

where, in the mathematical equation (8), P is a function to compensate the matching score s depending on the qualities $q_x$ and $q_y$ of the matching target patterns Ix and Iy. As this compensation function P, for example, a polynomial function can be employed. In a case that a quadric function is employed as the compensation function P, the compensation function P can be represented by a mathematical equation (9) as follows:

$$P(q_x,q_y) = a_1 q_x^2 + a_2 q_y^2 + a_3 q_x q_y + a_4 q_x + a_5 q_y + a_6 \qquad (9)$$

where, in the mathematical equation (9), $a_1$ to $a_6$ are parameters to determine the compensation function P. These parameters are learned (generated) in advance just like the matrix A described above. The $q_x$ and $q_y$ in the mathematical equation (9) denote the qualities of the matching target patterns Ix and Iy.

The determination unit 55 has a function of determining a result of matching of the matching target patterns Ix and Iy based on the post-compensation matching score $s_h$. Specifically, the determination unit 55 compares the post-compensation matching score $s_h$ with a predetermined threshold value α, and determines whether or not the matching score $s_h$ is larger than or equal to the threshold value α. In case of determining that the matching score $s_h$ is larger than or equal to the threshold value α, the determination unit 55 outputs, as a determination result D ($s_h$), a value "1" which represents that the matching target patterns Ix and Iy are identical patterns. Further, in case of determining that the matching score $s_h$ is not larger than or equal to the threshold value α (that is, the matching score $s_h$ is smaller than the threshold value α), the determination unit 55 outputs, as a determination result D $(s_h)$, a value "0" which represents that the matching target patterns Ix and Iy are mutually different patterns. This determination result can be represented by a following equation (10).

$$D(s_h) = \begin{cases} 1 & (s_h \geq \alpha) \\ 0 & (s_h < \alpha) \end{cases} \quad (10)$$

Figure 6:
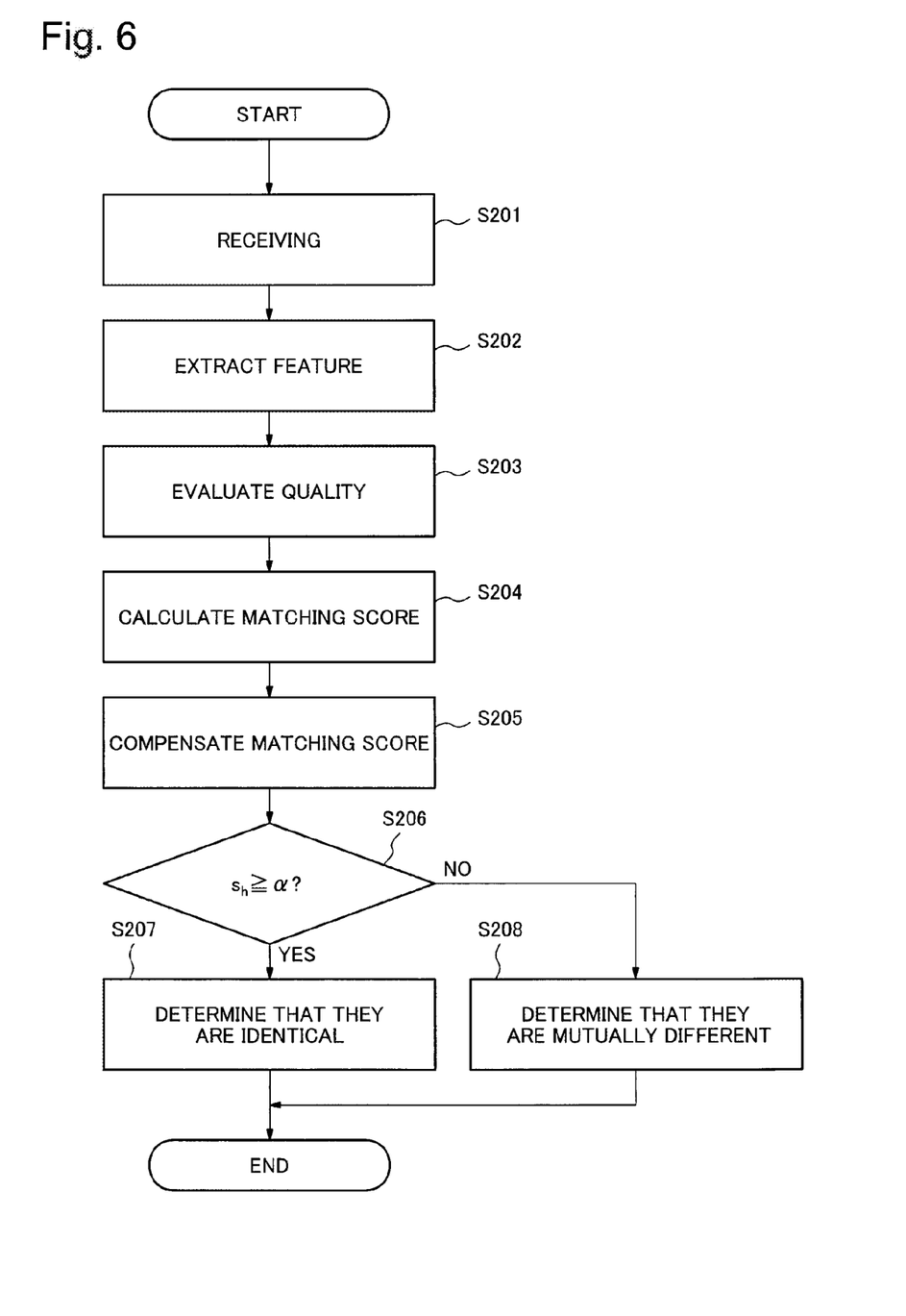
FIG. 6 is a flowchart illustrating an example of a matching processing performed by the pattern matching apparatus according to the fourth exemplary embodiment of the present invention.

Hereinafter, an example of operation of the matching processing in the pattern matching apparatus 40 according to this fourth exemplary embodiment will be described referring to FIG. 6. That is, FIG. 6 is a flowchart illustrating an example of the matching processing performed by the pattern matching apparatus 40. This flowchart illustrates an example of a control procedure of a program executed by the control device 41 in the pattern matching apparatus 40.

For example, when the matching target patterns Ix and Iy are input to the pattern matching apparatus 40, the control device 41 (the reception unit 50) receives these matching target patterns Ix and Iy (step S201). Further, the control device 41 (the feature extraction unit 51) extracts features (i.e., feature vectors x and y) of each of the matching target patterns Ix and Iy (step S202). Subsequently, the control device 41 (the quality evaluation unit 52) evaluates qualities $q_x$ and $q_y$ of the matching target patterns Ix and Iy based on the extracted features (step S203). Meanwhile, the control device 41 (the score calculation unit 53) calculates the matching score s to the matching target patterns Ix and Iy by using the features of each of the matching target patterns Ix and Iy (i.e., the feature vectors x and y) and the discrimination dictionary 46 (step S204).

Further, the control device 41 (the score compensation unit 54) compensates the matching score s by using the qualities $q_x$ and $q_y$ of the matching target patterns Ix and Iy and the quality dictionary 45, and thereby calculates the post-compensation matching score $s_h$ (step S205).

Subsequently, the control device 41 (the determination unit 55) determines whether or not the post-compensation matching score $s_h$ is larger than or equal to the threshold value α (step S206). As a result, in the case of determining that the post-compensation matching score $s_h$ is larger than or equal to the threshold value α, the control device 41 (the determination unit 55) determines that the matching target patterns Ix and Iy are identical patterns, and outputs the value "1" (step S207). In contrast, in the case of determining that the post-compensation matching score $s_h$ is not larger than or equal to the threshold value α (that is, in the case that the post-compensation matching score $s_h$ is smaller than the threshold value α), the control device 41 (the determination unit 55) determines that the matching target patterns Ix and Iy are mutually different patterns, and outputs the value "0" (step S208). After determining in this way, the control device 41 becomes in a standby state to prepare for next matching processing.

The pattern matching apparatus 40 according this fourth exemplary embodiment evaluates the qualities of the matching target patterns by using the quality dictionary learned by the dictionary learning device 20 according to the second or third exemplary embodiment. As described above, the quality dictionary is the dictionary learned by using the matching scores, and thus, the pattern matching apparatus 40 according to this fourth exemplary embodiment can perform the evaluation specializing in the matching processing concerning the qualities of the matching target patterns. Consequently, the pattern matching apparatus 40 of this fourth exemplary embodiment enables further improvement of the accuracy of the matching result, and thus, enables further improvement of the reliability of the matching determination.

(Other Exemplary Embodiments)

It is to be noted here that the present invention is not limited to the first to fourth exemplary embodiments, and can be practiced in the form of various embodiments. For example, in the fourth exemplary embodiment, there is described the example in which the quality dictionary to use in evaluating the matching target pattern Ix and the quality dictionary to use in evaluating the matching target pattern Iy are same. In contrast, the quality dictionary to use in evaluating the matching target pattern Ix and the quality dictionary to use in evaluating the matching target pattern Iy may be mutually different. As an example of a case where such mutually different quality dictionaries are used, there can be given a case where degradation degrees (degradation processes) of the matching target patterns Ix and Iy are mutually different, such as a case where one of the matching target patterns Ix and Iy is a picture (a still image) and the other one thereof is a video (a moving image).

Such mutually different quality dictionaries described above are generated in a manner such that the dictionary learning device described in the first to third exemplary embodiments learns separately the quality dictionaries by the machine learning based on the mutually different sample patterns, which are each associated with the matching target patterns Ix and Iy, and the degradation patterns resulting from the mutually different degrading processing each associated with the matching target patterns Ix and Iy.

Further, there is a case where it is already known that one of the matching target patterns Ix and Iy is of a high quality. For example, in the case of biometrics authentication, one of the matching target patterns Ix and Iy is a reference pattern which is given in advance, and in most of cases, a pattern is not employed as the reference pattern unless this pattern is a high-quality pattern. In such biometrics authentication, the matching target pattern acquired as the matching target is compared to the reference pattern, and the pass or fail of the authentication is determined based on the result of that comparison. In a case that the pattern matching apparatus 40 performs the matching processing for such biometrics authentication, the pattern matching apparatus 40 may omit the processing to evaluate the quality of the high-quality matching target pattern (i.e., the reference pattern) of being the one of the matching target patterns Ix and Iy. In this case, the pattern matching apparatus 40 compensates the matching score based on the quality evaluation result of only the evaluated matching target patterns (i.e., the other of the matching target patterns Ix and Iy).

Moreover, although, in the aforementioned exemplary embodiments, there are described the example of the configuration in which individual functions of a computer (a control device) are realized by a computer program (software) stored in a storage medium, the configuration may be made such that part of or the whole of the functions is realized by hardware.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2011-275872, filed on Dec. 16, 2011, the disclosure of which is incorporated herein in its entirety by reference.

[Industrial Applicability]

The present invention can be applied to a field where the pattern matching processing is utilized, such as an authentication technology.

[Reference Signs List]

1 and 20: Dictionary learning device
2, 28 and 53: Score calculation unit
3 and 30: Learning unit
5 and 40: Pattern matching apparatus
7 and 52: Quality evaluation unit
8 and 54: Score compensation unit
9 and 55: Determination unit
29 and 51: Feature extraction unit

The invention claimed is:

1. A dictionary learning device comprising:
a score calculation unit that calculates a matching score representing a similarity-degree between a sample pattern which is a sample of a pattern which is likely to be subjected to a pattern matching processing and a degradation pattern resulting from a degrading processing on the sample pattern; and
learning unit that, based on the calculated matching score and the degradation pattern, learns a quality dictionary which is used in a processing to evaluate a degradation degree of a matching target pattern of being target to be subjected to the pattern matching processing.

2. The dictionary learning device according to claim 1, further comprising degrading processing unit that generates the degradation pattern by performing the degrading processing on the sample pattern.

3. The dictionary learning device according to claim 1, further comprising feature extraction unit that extracts a feature of the sample pattern and a feature of the degradation pattern,
wherein the score calculation unit that calculates the matching score based on the extracted features of the sample pattern and the degradation pattern.

4. The dictionary learning device according to claim 1, wherein the quality dictionary is a dictionary through which a matching score representing a similarity-degree between the matching target pattern and a virtual pattern, which relates to the matching target pattern and is in a non-degradation degree, is obtained.

5. The dictionary learning device according to claim 1, wherein the sample pattern and the degradation pattern are each an image pattern or a speech signal pattern.

6. A pattern matching apparatus comprising:
a quality dictionary that is learned by a dictionary learning device according to claim 1;
quality evaluation unit that, based on the quality dictionary, evaluates a degradation degree of a matching target pattern which is target to be subjected to a pattern matching processing;
score calculation unit that calculates a matching score representing a similarity-degree among the plurality of matching target patterns by a processing corresponding to a processing through which the dictionary learning device calculates the matching score;
score compensation unit that compensates the matching score by using an evaluation result obtained by the quality evaluation unit; and
determination unit that determines a result of matching among the plurality of matching target patterns based on the compensated matching score.

7. The pattern matching apparatus according to claim 6, further comprising feature extraction unit that extracts a feature of the matching target pattern, wherein the score calculation unit calculates the matching score based on each extracted feature of the matching target patterns.

8. A method for learning dictionary comprising:
calculating, by a computer, a matching score representing a similarity-degree between a sample pattern which is a sample of a pattern which is likely to be subjected to a pattern matching processing and a degradation pattern resulting from a degrading processing on the sample pattern; and
learning, by the computer, based on the calculated matching score and the degradation pattern, a quality dictionary which is used in a processing to evaluate a degradation degree of a matching target pattern of being target to be subjected to the pattern matching processing.

9. A non-transitory computer-readable storage medium that stores therein a control procedure which causes a computer to execute a processing, comprising the processes of:
calculating a matching score representing a similarity-degree between a sample pattern which is a sample of a pattern which is likely to be subjected to a pattern matching processing and a degradation pattern resulting from a degrading processing on the sample pattern; and
learning, based on the calculated matching score and the degradation pattern, a quality dictionary which is used in a processing to evaluate a degradation degree of a matching target pattern of being target to be subjected to the pattern matching processing.

10. A dictionary learning device comprising:
score calculation means for calculating a matching score representing a similarity-degree between a sample pattern which is a sample of a pattern which is likely to be subjected to a pattern matching processing and a degradation pattern resulting from a degrading processing on the sample pattern; and
learning means for, based on the calculated matching score and the degradation pattern, learning a quality dictionary which is used in a processing to evaluate a degradation degree of a matching target pattern of being target to be subjected to the pattern matching processing.

* * * * *